United States Patent
Ikuta et al.

(10) Patent No.: US 8,803,382 B2
(45) Date of Patent: Aug. 12, 2014

(54) RECTIFYING DEVICE OF VEHICLE ALTERNATOR

(75) Inventors: Hiroya Ikuta, Chiyoda-ku (JP);
Hirotaka Kimata, Chiyoda-ku (JP);
Kazunori Tanaka, Chiyoda-ku (JP);
Kenji Nakao, Laguna (PH)

(73) Assignee: Mitsubishi Electric Corporation, Tokyo (JP)

(*) Notice: Subject to any disclaimer, the term of this patent is extended or adjusted under 35 U.S.C. 154(b) by 303 days.

(21) Appl. No.: 12/936,846

(22) PCT Filed: Jun. 16, 2008

(86) PCT No.: PCT/JP2008/060959
§ 371 (c)(1),
(2), (4) Date: Oct. 7, 2010

(87) PCT Pub. No.: WO2009/153850
PCT Pub. Date: Dec. 23, 2009

(65) Prior Publication Data
US 2011/0037356 A1 Feb. 17, 2011

(51) Int. Cl.
*H02K 11/04* (2006.01)
(52) U.S. Cl.
USPC .......... 310/68 D; 310/68 R; 310/71; 140/102; 140/104; 140/105; 140/106
(58) Field of Classification Search
CPC .................................................. H02K 11/04
USPC ......... 310/68 D, 68 R, 71; 165/185; 361/709; 140/102, 104, 105, 106

IPC ........................................................ H02K 11/04
See application file for complete search history.

(56) References Cited

U.S. PATENT DOCUMENTS

| | | | | |
|---|---|---|---|---|
| 3,540,494 A | * | 11/1970 | Susong | 140/1 |
| 4,862,929 A | * | 9/1989 | Perry | 140/105 |
| 5,234,363 A | * | 8/1993 | Motose | 440/77 |
| 5,682,070 A | * | 10/1997 | Adachi et al. | 310/71 |
| 6,100,613 A | * | 8/2000 | Tanaka et al. | 310/68 D |
| 6,426,575 B1 | * | 7/2002 | Masegi et al. | 310/68 D |
| 6,661,662 B2 | * | 12/2003 | DeNardis | 361/709 |
| 6,664,674 B2 | * | 12/2003 | Ihata | 310/64 |
| 6,664,675 B2 | * | 12/2003 | Kaizu | 310/68 D |
| 6,740,995 B2 | * | 5/2004 | Oohashi et al. | 310/68 D |
| 6,882,069 B1 | * | 4/2005 | Kashihara et al. | 310/68 D |
| 2011/0037356 A1 | * | 2/2011 | Ikuta et al. | 310/68 D |

FOREIGN PATENT DOCUMENTS

| | | |
|---|---|---|
| JP | 11-252877 A | 9/1999 |
| JP | 3839576 B2 | 9/1999 |
| JP | 2001-175194 A | 6/2001 |

* cited by examiner

*Primary Examiner* — John K Kim
(74) *Attorney, Agent, or Firm* — Sughrue Mion, PLLC

(57) ABSTRACT

A highly reliable rectifying device of a vehicle alternator capable of improving the vibration resistance of a diode. A connection lead 33d of a diode 33 included in a rectifying device includes a linear part 33f extended in parallel from a metallic base 33b, and a bent part 33g bent 90° or more substantially like an arc from the linear part 33f. The bending radius R of the bent part 33g is set to a value larger than a separation distance w in a horizontal direction between the terminal of the linear part 33f and the distal part of the connection lead 33d.

2 Claims, 3 Drawing Sheets

RECTIFYING DEVICE OF VEHICLE ALTERNATOR

TECHNICAL FIELD

The present invention relates to a rectifying device of a vehicle alternator that is incorporated in the vehicle alternator and rectifies an AC output voltage of the vehicle alternator into a DC voltage.

BACKGROUND ART

As described in Patent Document 1, a conventional vehicle alternator has a field current fed to an exciting coil thereof via a brush and a slip ring. At the same time, a rotating torque for an engine is conveyed to a rotation shaft byway of a pulley and a belt, and a rotor is driven to rotate. This causes a stator to develop an AC voltage. A rectifying device is attached to a rear bracket, is connected to an output terminal of a stator coil, and converts an AC output voltage, which is developed at the stator, into a DC voltage.

A diode included in the rectifying device has an IC chip soldered to a copper base. A copper relay lead is soldered to the IC chip, and a copper connection lead is further soldered to the relay lead. The IC chip is then molded with a sealing resin body.

Patent Document 1: Japanese Patent No. 3839576

DISCLOSURE OF THE INVENTION

Problem to be Solved by the Invention

In the foregoing rectifying device, the connection lead has a bend or a bent part so that a stress generated at an IC chip due to a vibration stemming from attachment to a vehicle can be alleviated. The bend or bent part causes concentration of the stress. In addition, since the bend or bent part is located close to a junction region with respect to the IC chip or relay lead, a large stress is generated due to a displacement of the junction region by the vibration. This poses a problem in that the connection lead is broken at the bend or bent part.

The present invention is intended to solve the foregoing problem. An object of the present invention is to provide a rectifying device of a vehicle alternator capable of improving the vibration resistance of a diode.

Means for solving the Problem

The present invention is a rectifying device of a vehicle alternator that includes a heat sink, a circuit board which has a connection terminal disposed to be orthogonal to the heat sink and which is disposed in parallel with the heat sink, and a diode which includes a metallic base having one surface thereof joined to the heat sink, an IC chip joined to the other surface of the metallic base, a sealing resin body with which the IC chip is molded, and a connection lead having one end thereof electrically coupled to the IC chip and having the other end thereof joined to the connection terminal of the circuit board. The rectifying device is incorporated in the vehicle alternator, and rectifies an AC output voltage of the vehicle alternator into a DC voltage. Herein, the connection lead of the diode has a linear part extended in parallel from the metallic base and bared from the sealing resin body, and a bent part that is bent 90° or more substantially like an arc from the linear part. The bending radius R of the bent part is set to a value larger than a separation distance w in a horizontal direction between the root of the linear part bared from the sealing resin body and the distal part of the connection lead.

Advantage of the Invention

According to the present invention, since the bending radius R of the bent part of the connection lead of the diode can be made large, even if the rectifying device is downsized, concentration of a generated stress on the bent part of the connection lead of the diode can be alleviated and breakage of the bent part can be suppressed. The highly reliable rectifying device of the vehicle alternator can be provided.

DESCRIPTION OF REFERENCE NUMERALS

Figure 1:
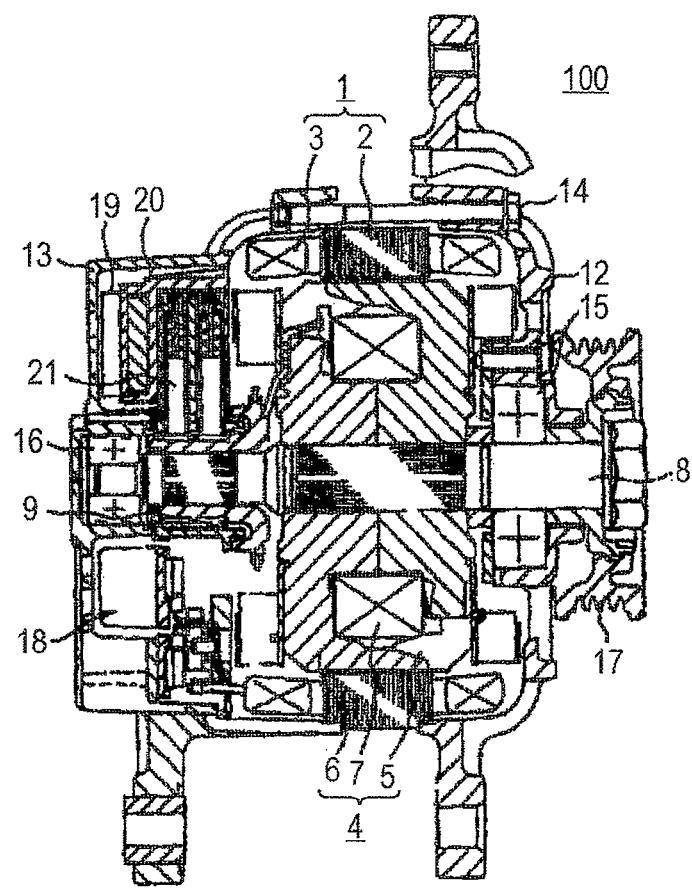
FIG. 1 is a sectional view showing a vehicle alternator in which a rectifying device in accordance with Embodiment 1 of the present invention is incorporated.

100: vehicle alternator
18: rectifying device
30: heat sink
32: circuit board
33: diode
33a: IC chip
33b: metallic base
33c: relay lead
33d: connection lead
33e: sealing resin body
33f: linear part
33g: bent part
33h: junction region
33i: inclined part
34: diode
37: connection terminal

BEST MODE FOR CARRYING OUT THE INVENTION

Embodiment 1

Figure 2:
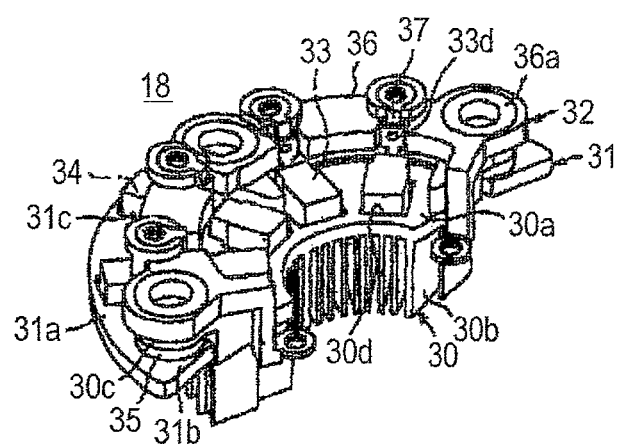
FIG. 2 is a perspective view showing the rectifying device in accordance with Embodiment 1.

FIG. 1 is a sectional view showing a vehicle alternator in which a rectifying device in accordance with Embodiment 1 of the present invention is incorporated, and FIG. 2 is a perspective view showing the rectifying device shown in FIG. 1.

In FIG. 1, a stator 1 includes a stator core 2 and a stator coil 3 wound around the stator core 2. A rotor 4 includes a pair of pole cores 5 and 6 that are opposed to each other, an exciting coil 7 interposed between the cores 5 and 6, a rotation shaft 8, and a slip ring 9 fixed to the rotation shaft 8. A rear bracket 13 is fixed to a front bracket 12 by a fastening bolt 14, and the stator 1 is supported between the front bracket 12 and rear bracket 13. The rotation shaft 8 is borne by the front bracket 12 and rear bracket 13 via bearings 15 and 16. A pulley 17 is fixed to one end of the rotation shaft 8. A rectifying device 18 is attached to the rear bracket 13, is connected to an output terminal of the stator coil 3, and converts an AC voltage developed at the stator 1 into a DC voltage. A voltage regulator 19 is attached to the rear bracket 13 together with a brush holder 20. The brush holder 20 bears a brush 21 so that the brush 21 can abut against the slip ring 9.

In the vehicle alternator 100, a field current is fed to the exciting coil 7 via the brush 21 and the slip ring 9. At the same time, a rotating torque for an engine is conveyed to the rotation shaft 8 by way of the pulley 17 and a belt (not shown). Thus, the rotor 4 is driven to rotate. This causes the stator 1 to develop an AC voltage. The AC voltage is converted into a DC voltage by the rectifying device 18.

Now, referring to FIG. 2, the construction of the rectifying device 18 will be described below.

The rectifying device 18 includes a +side heat sink 30 having plural +side diodes 33 mounted therein, a −side heat sink 31 having plural −side diodes 34 mounted therein, and a circuit board assembly 32.

The +side heat sink 30 is made of aluminum and includes a notched annular part 30a and plural heat radiation fins 30b stood on the rear side of the notched annular part 30a. Positioning guides 30c are extended from three respective positions on the notched annular part, that is, at both the ends of the notched annular part 30a and in the center thereof to outside in a radial direction. Plural +side diode mounts 30d are formed convexly in a circumferential direction of the principal surface of the notched annular part 30a. The plural +side diodes 33 are joined to the respective +side diode mounts 30d, and thus mounted in the circumferential direction on the principal surface of the notched annular part 30a.

The −side heat sink 31 is made of aluminum, and includes a notched annular part 31a, guide portions 31b disposed at three positions on the notched annular part 31a, that is, at both the ends of the notched annular part 31a and in the center thereof, and plural −side diode mounts 31c formed concavely in a circumferential direction in the principal surface of the notched annular part 31a. The plural −side diodes 34 are joined to the respective −side diode mounts 31c, and thus mounted in the circumferential direction on the principal surface of the notched annular part 31a.

The circuit board 32 includes a resin body 36 that has an iron circuit board molded with a polyphenylene sulfide (PPS) and shaped like a notched annulus, and guide portions 36a formed at three positions on the resin body 36, that is, at both the ends of the resin body 36 and in the center thereof. Connection terminals 37 of the circuit board are jutted downward from the resin body 36 at plural positions in the circumferential direction.

Figure 3:
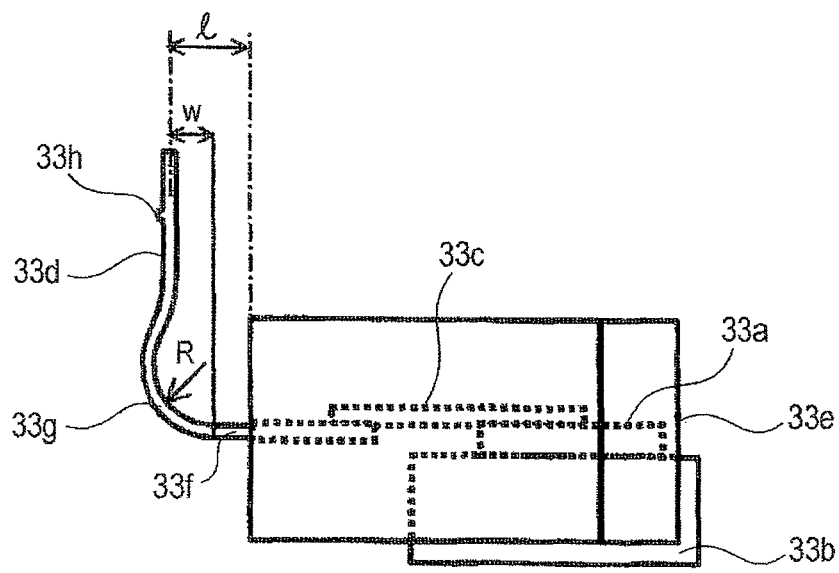
FIG. 3 is a schematic side view of a diode adapted to the rectifying device in accordance with Embodiment 1.

FIG. 3 is a schematic side view of a diode adapted to the rectifying device in accordance with Embodiment 1.

In FIG. 3, the +side diode 33 has an IC chip 33a soldered to a metallic base 33b made of copper, has a relay lead 33c, which is made of copper, soldered to the IC chip 33a, has a connection lead 33d, which is made of copper, soldered to the relay lead 33c, so as to be molded with a sealing resin body 33e.

The connection lead 33d has a shape of being bent nearly at right angles while forming a bent part 33g that is bent 90° or more substantially like an arc from a linear part 33f extended from the sealing resin body 33e in parallel with the metallic base 33b. In the distal part thereof, a junction region 33h to be joined to the connection terminal 37 of the circuit board is formed.

Herein, the bending radius R of the bent part 33g of the connection lead 33d is set to a value larger than a separation distance w in a horizontal direction between the terminal of the linear part 33f and the distal part of the connection lead 33d.

Incidentally, the −side diode 34 is constructed similarly to the +side diode 33.

Along with downsizing of the rectifying device 18, even when the distance l between the junction region of the connection lead 33d (part to be joined to the connection terminal 37 of the circuit board 32) and the bared root of the linear part 33f is short, the bending radius R of the bent part 33g can be increased. Therefore, concentration of a generated stress on the bent part 33g can be alleviated, and breakage of the bent part 33g can be suppressed.

In addition, since the bent part 33g acts as a spring structure, a vibration can be absorbed, and a stress generated at the IC chip 33a can be reduced.

Figure 4:
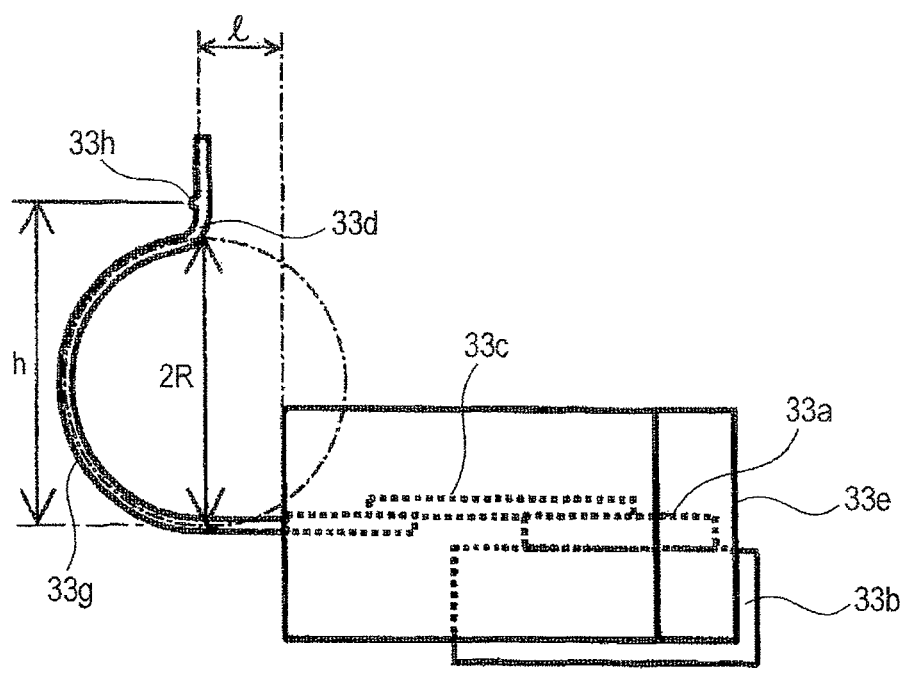
FIG. 4 is a schematic explanatory diagram for explaining the shape of a lead of the diode in Embodiment 1.

In Embodiment 1, when the bending radius R is larger, a stress generated at the bending part 33g is more greatly alleviated. Assuming that l [mm] denotes the distance from the root of the connection lead 33d to the neutral line of a region bent at right angles, and h [mm] (see FIG. 4) denotes the distance from the neutral line of the linear part 33f to the junction region 33h of the distal part of the connection lead, it is under h>2l that the stress is alleviated owing to the formation of the bent part 33a. In contrast, under h≤2l, it is better not to form the bent part 33g.

Figure 5:
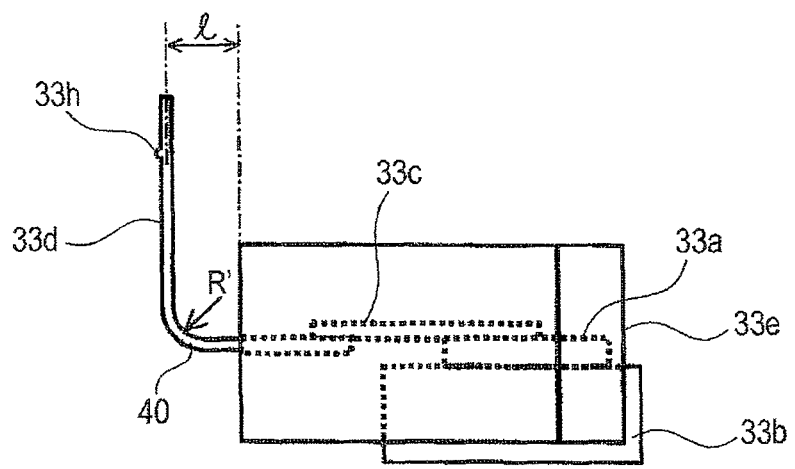
FIG. 5 is a schematic side view of a diode adapted to a conventional rectifying device.
Figure 6:
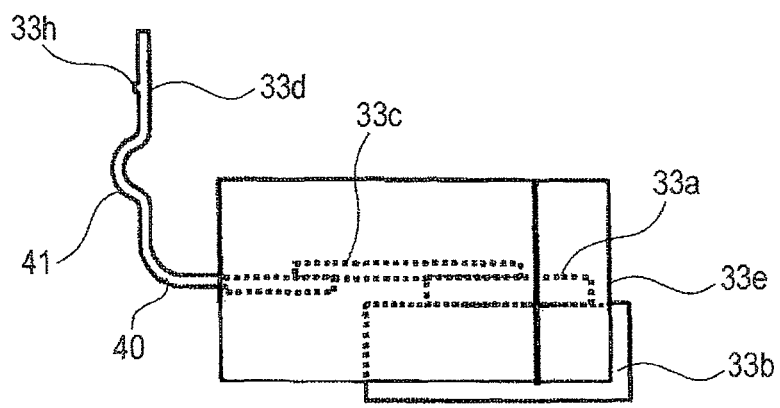
FIG. 6 is a schematic side view showing another example of the diode adapted to the conventional rectifying device.

For example, FIG. 5 and FIG. 6 show examples of a conventional diode under h=10 [mm] and l=4 [mm]. When a bent part 40 of a bending radius R'≤1 is merely formed as shown in FIG. 5, the bend part 40 fills the role of a damper that absorbs a vibration stemming from attachment to a vehicle. However, since the bending radius R' is small, a damper effect is limited. A stress generated at the IC chip 33a cannot be reduced. In addition, since the bending radius R' is small, concentration of the generated stress on the bent part is intense. The connection lead is broken at the bent part.

Next, when a bend 41 is formed in the linear part as shown in FIG. 6, since the bend 41 serves as a damper, a stress generated at the IC chip 33a can be reduced. However, since both the bent part 40 and bend 41 are formed over the distance h [mm], the bending radius R of the bend cannot help being small. The stress is concentrated on the bend. In addition, a stress generated at the bend 41 due to a displacement of the junction region 33h is inversely proportional to the distance from the junction region 33h. As apparent from the drawing, however, since the distance between the junction region 33h and bend 41 is small, a large stress is generated at the bend 41 due to the displacement of the junction region 33h. For the two reasons, the connection lead may be broken at the bent part 40 or bend 41.

In contrast, when the bent part 33g like the one in Embodiment 1 shown in FIG. 3 is formed, since the bent part 33g acts as a spring structure, a stress generated at the IC chip 33a can be reduced. In addition, since the bending radius R of the bent part is large, concentration of the generated stress on the bent part can be alleviated. Compared with FIG. 6, the distance between the junction region 33h and bent part 33g is large. Therefore, a stress generated due to a displacement of the junction region can be reduced. Eventually, the stress generated at the IC chip 33a can be reduced without breakage of the connection lead 33d.

According to the results of stress analysis conducted, assuming that in the case of applying the conventional bent part 40 a maximum stress generated at the connection lead 33*d* is 1 and a stress generated at the IC chip 33*a* is 1, when the bend 41 is formed in the linear part 33F as shown in FIG. 6, the maximum stress generated at the connection lead 33*d* is 1.5 and the stress generated at the IC chip 33*a* is 0.6. In contrast, when the bent part 33*g* like the one shown in FIG. 3 is formed, the maximum stress generated at the connection lead 33*d* is 0.7 and the stress generated at the IC chip 33*a* is 0.5. The advantage of the present invention has thus been verified.

Figure 7:
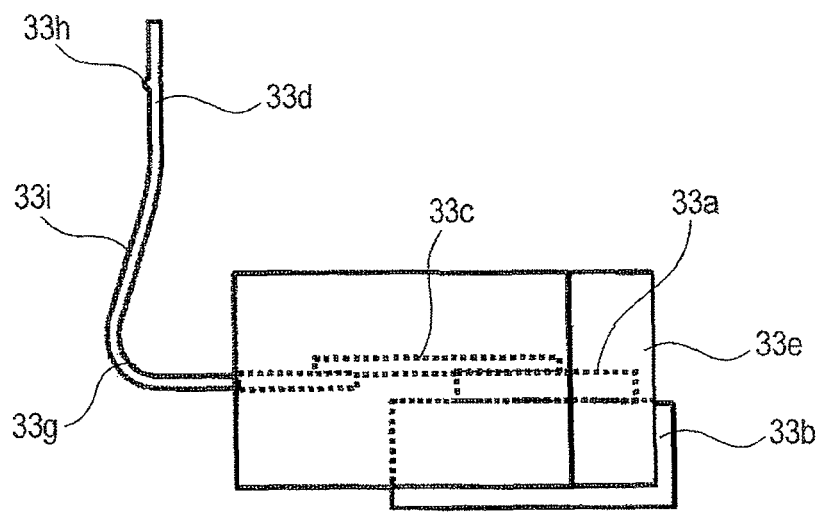
FIG. 7 is a schematic side view showing another example of the diode adapted to the rectifying device in accordance with Embodiment 1.

Incidentally, the present invention is not limited to the shape of the connection lead 33*d* shown in FIG. 3. Even with, for example, a shape of being bent at right angles from the bent part 33*g* through an inclined part 33*i* as shown in FIG. 7, the same advantage is exerted.

The invention claimed is:

1. A rectifying device of a vehicle alternator, the rectifying device comprising:
   a heat sink;
   a circuit board including a connection terminal disposed to be orthogonal to the heat sink, and being disposed in parallel with the heat sink; and
   a diode assembly including:
      a metallic base that has a first surface joined to the heat sink,
      an IC chip joined to a second surface of the metallic base,
      a sealing resin body with which the IC chip is molded, and
      a connection lead that has one end electrically coupled to the IC chip and has the other end joined to the connection terminal of the circuit board,
   wherein the connection lead includes a linear part that is extended in parallel to the second surface of the metallic base and bared from the sealing resin body at a root, and a bent part that is bent more than 90° substantially like an arc from the linear part,
   a bending radius R of the bent part is set to a value larger than a separation distance w in a horizontal direction between a terminal of the linear part and a distal part of the connection lead,
   the terminal of the linear part is disposed between the root of the linear part and a vertical line drawn through the distal part of the connection lead, and
   a distance from the bared root of the linear part to a most distal portion of the arc of the bent part is less than twice the bending radius R.

2. The rectifying device of the vehicle alternator according to claim 1, wherein the rectifying device is incorporated in the vehicle alternator and rectifies an AC output voltage of the vehicle alternator into a DC voltage.

* * * * *